No. 607,014. Patented July 12, 1898.
C. B. BOSTWICK.
POWER MECHANISM FOR TRACTION ENGINES.
(Application filed Nov 23, 1897.)
(No Model.) 3 Sheets—Sheet 1.

WITNESSES:
Ed. H. Floyd.
Harry E. Lehman.

INVENTOR
Chauncey B. Bostwick,
BY
Mark M. Decker
ATTORNEY.

THE NORRIS PETERS CO., PHOTO-LITHO., WASHINGTON, D. C.

No. 607,014. Patented July 12, 1898.
C. B. BOSTWICK.
POWER MECHANISM FOR TRACTION ENGINES.
(Application filed Nov 23, 1897.)
(No Model.) 3 Sheets—Sheet 2.

No. 607,014. Patented July 12, 1898.
C. B. BOSTWICK.
POWER MECHANISM FOR TRACTION ENGINES.
(Application filed Nov 23, 1897.)
(No Model.) 3 Sheets—Sheet 3.

WITNESSES:
Geo. H. V. Floyd.
Harry E. Lehman.

INVENTOR
Chauncey B. Bostwick
BY
Mark M. Decker
ATTORNEY.

UNITED STATES PATENT OFFICE.

CHAUNCEY B. BOSTWICK, OF PITTSBURG, PENNSYLVANIA.

POWER MECHANISM FOR TRACTION-ENGINES.

SPECIFICATION forming part of Letters Patent No. 607,014, dated July 12, 1898.

Application filed November 23, 1897. Serial No. 659,599. (No model.)

*To all whom it may concern:*

Be it known that I, CHAUNCEY B. BOSTWICK, a citizen of the United States, residing at Pittsburg, in the county of Allegheny and State of Pennsylvania, have invented a certain new and useful Improvement in Power Mechanism for Traction-Engines; and I do hereby declare that the following is a full, clear, and exact description of the invention, such as will enable others skilled in the art to which it appertains to make and use the same.

My invention relates to power mechanism for traction-engines; and the object of my invention is to provide means whereby a greater bearing-surface is obtained, thereby affording a greater power than has heretofore been obtained in or by traction-engines.

By the adoption and use of my improved mechanism the main driving-wheels are prevented from sinking into the earth, thereby overcoming one of the greatest obstacles heretofore known in the use of traction-engines.

My invention consists in certain novel features and details of construction, as will hereinafter be described, and finally pointed out in the claims.

I will now describe my invention, reference being had to the accompanying drawings, in which—

Figure 1:
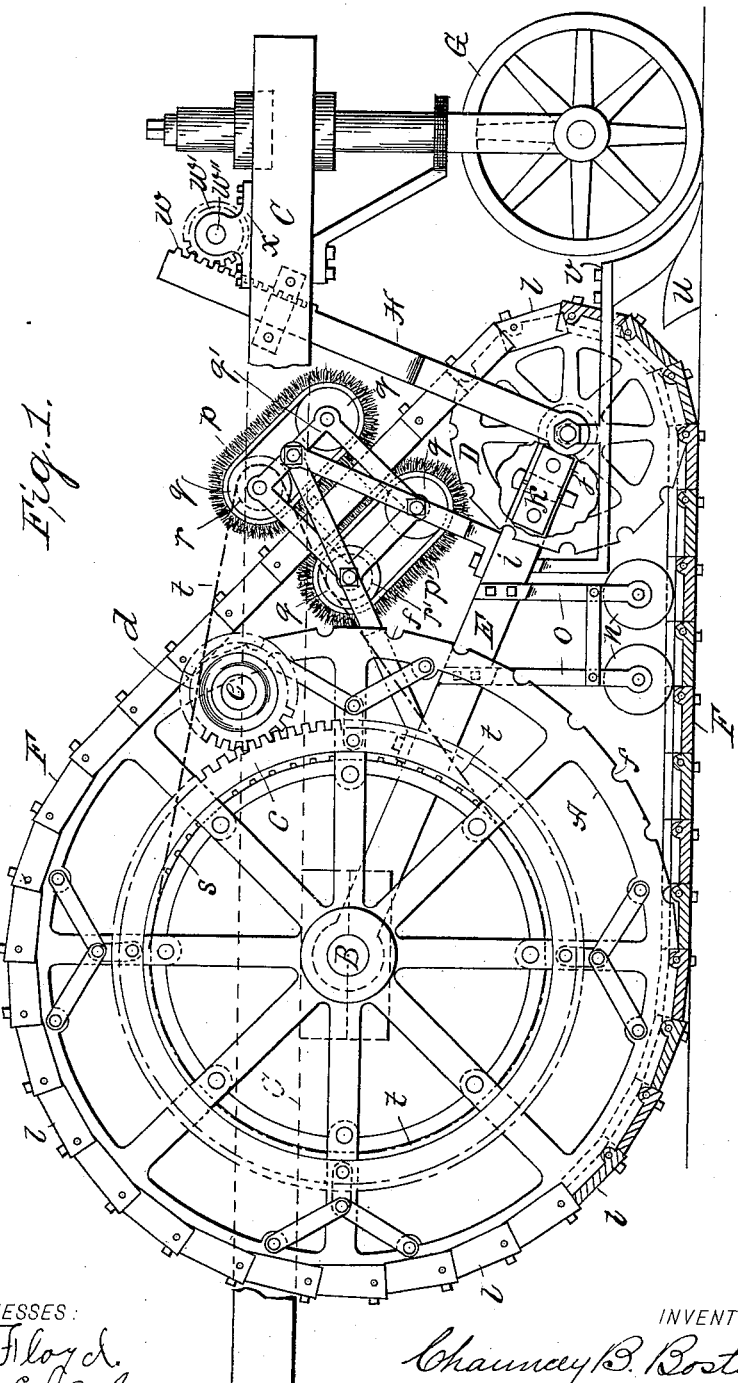
Figure 2:
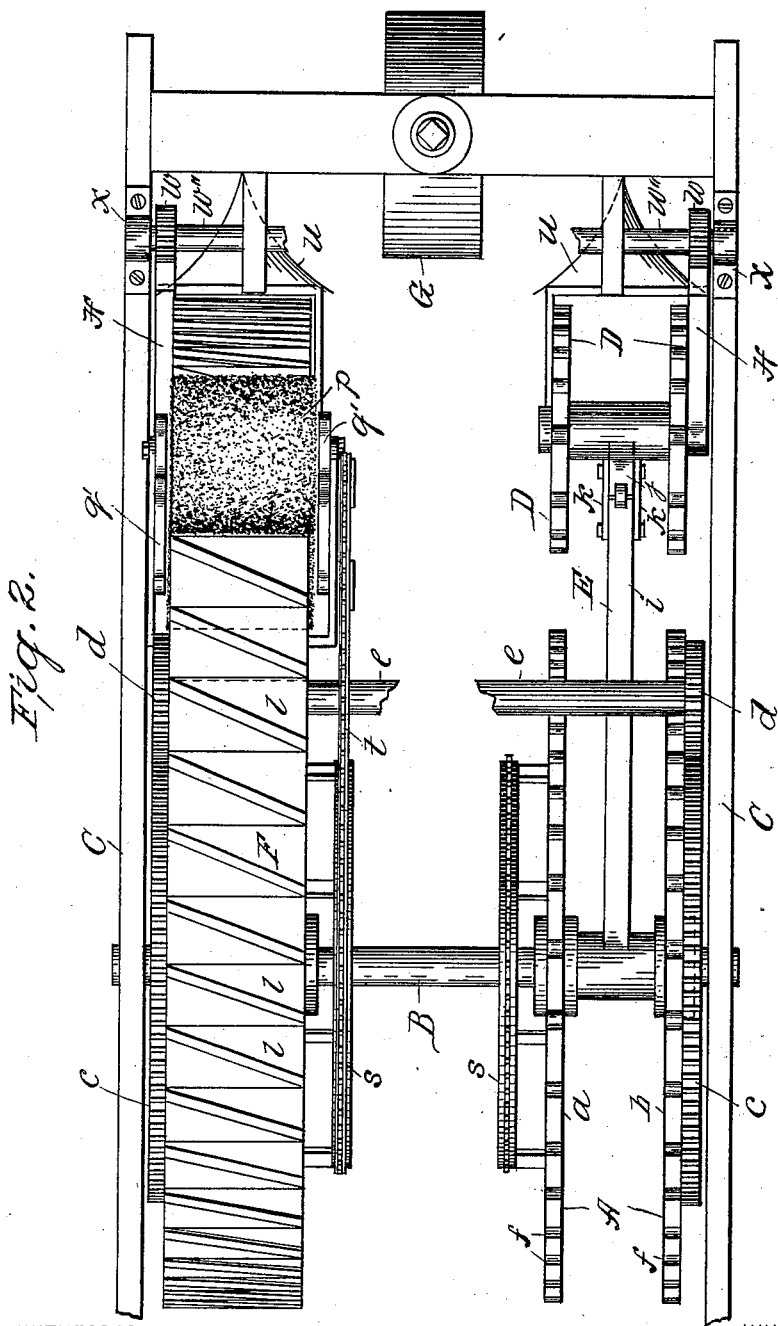
Figure 3:
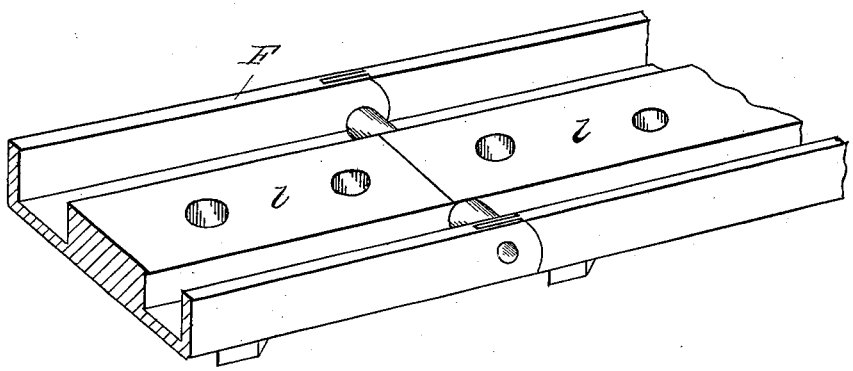
Figure 4:
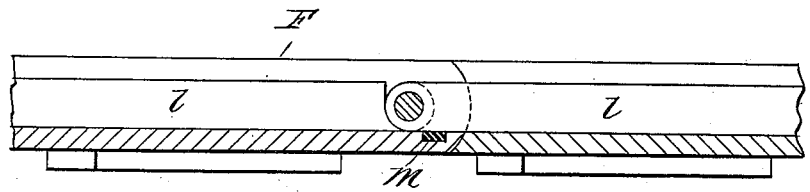
Figure 5:
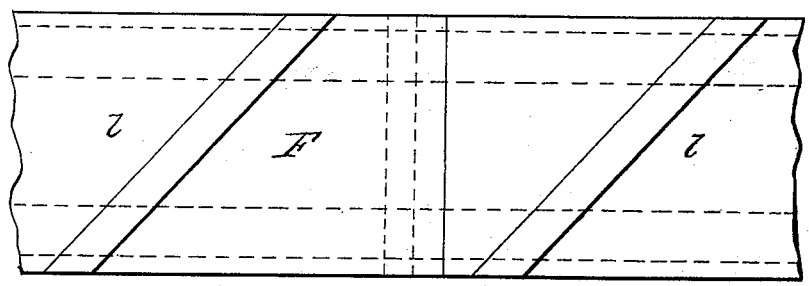

Figure 1 is a side elevation of a machine embodying my invention. Fig. 2 is a plan view of the same. Fig. 3 is a perspective view in section, showing a joint of my improved hinged metal belting. Fig. 4 is a longitudinal sectional view of the same, and Fig. 5 is an inverted plan view of same.

Similar letters of reference indicate corresponding part in the several figures.

In the drawings, A represents the main driving-wheels employed in a traction-engine built after my invention. Each of these wheels is formed in two parts $a$ and $b$, and they are connected with each other by a hub.

The wheels proper are journaled on an axle B, which in turn supports one end of the main engine-frame C. These wheels A are adapted to rotate on said axle independently of each other, being driven by a separate engine. (Not shown.)

Bolted or otherwise secured to the main driving-wheels A are gear-wheels $c$, which are adapted to mesh with pinions $d$, formed on the ends of the engine-shaft $e$, the purpose of said gears and pinions being to impart a rotary movement to the main wheels A, which in turn propel the engine proper. The periphery of the wheels A is formed with recesses $f$.

As will be seen by reference to the drawings, auxiliary wheels D are provided in the ends of arms or supports E, the opposite ends of which encircle the hubs of the main driving-wheels A. These auxiliary wheels are also formed in two parts $g$ and $h$ and are connected together in the same manner as the driving-wheels by a hub. The end of the arm or support encircles the hub of these wheels, as it does the hub of the driving-wheels. The arm or support is made in two parts $i$ and $j$ and these are connected together by plates $k$, which are secured to the side of said arm or support by bolts, screws, or in any other suitable manner. The auxiliary wheels are also provided with recesses within their periphery.

For affording a better and greater bearing-surface for the wheels I provide an endless metal belt F, which is made in sections $l$ and hinged together, as best shown in Figs. 3 and 4. This belt passes around the main driving-wheels A and auxiliary wheels D, as shown in Fig. 1, and forms a greater bearing-surface for the wheels than could otherwise be secured. Each of the joints of the belt is provided with a piece of rubber $m$, so that when the joint is closed and in contact with the ground it will prevent mud and dirt from entering therein.

Small tension-wheels $n$ are provided for keeping the belt in close proximity with the ground between the driving and auxiliary wheels. These tension-wheels are supported in brackets $o$, which are secured to the arms or supports E in any suitable manner.

For the purpose of keeping the belt free from dust and dirt I provide endless revolving brushes $p$ and $p'$, one on each side of the belt and in constant contact therewith. These brushes revolve on rollers $q$, which are journaled in a frame $q'$, supported on or by the arm or support E. On one end of the rollers are secured sprocket-wheels $r$ and $r'$, and on the inner sides of the main driving-wheels are sprocket-wheels $s$. A sprocket-chain $t$ passes around the sprocket-wheel $s$ and over the sprocket $r$ and thence around the sprocket $r'$, which causes the brushes to rotate in the same direction, thus keeping the belt free from dust and dirt. A pan or shelf (not shown) may be placed under the lower brush to catch whatever dust or dirt may be brushed from the inner side of the belt.

Plows $u$ are secured to a frame $v$, which is pivoted to the axle of the auxiliary wheels. The rear end of said frame passes back and upwardly, resting against the under side of the arm or support E. The purpose of these plows is to remove any small knolls or projections which might interfere with the belt, thus providing a level surface for the same to travel upon.

For the purpose of supporting the front end of the engine-frame I provide a pilot-wheel G of any ordinary and suitable construction.

For convenience in turning a lever H is provided, which is secured to the axle of the auxiliary wheels and passes upwardly to a point above the top of the frame. The upper end of this lever is provided with a rack $w$, which meshes with a pinion $w'$, secured on a shaft $w''$, which is journaled in suitable bearings $x$. This pinion is adapted to be operated in any suitable manner and the purpose of which is to lift the auxiliary wheels and belt clear of the ground while turning the machine.

The operation of my invention is as follows: When power is applied to the main driving-wheels through the medium of the pinions $d$, the said wheels will be caused to rotate, which movement will propel the machine, as also the endless belts which encircle the driving and auxiliary wheels. The movement of the machine will also cause the brushes to rotate, thereby keeping the belt free from all dust and dirt. As the machine moves forward, the plows will, as before stated, remove all obstructions and form a level surface for the belt to travel upon.

When it is desired to turn the machine, the auxiliary wheels, together with the belts, will be lifted clear of the ground by the lever H and pinions $w'$, when one of the main driving-wheels will be brought into action and the machine turned in either direction, as desired.

Having described my invention, what I claim is—

1. An improved power mechanism for traction-engines, consisting of the main driving-wheels and auxiliary wheels, each provided with recesses within their periphery for engaging a metal belt for forming a better and greater bearing-surface therefor, tension-wheels journaled in a frame which is secured to the arm or support, said tension-wheels being in constant contact with the inner surface of the belt for keeping said belt in close proximity with the ground, together with the revolving brushes, one on either side of the belt and in constant contact therewith, said brushes being operated by a sprocket-chain which passes over sprocket-wheels secured to the main driving-wheels and on the ends of the rollers over which the brushes rotate, substantially as shown and described.

2. An improved power mechanism for traction-engines, consisting of the main and auxiliary driving-wheels, said auxiliary wheels being journaled in arms or supports, a frame pivoted to the axles of said auxiliary wheels and provided at its forward end with a plow and its rear end resting against the under side of the arm or support, together with a pilot-wheel for supporting the forward end of the engine-frame proper, substantially as and for the purposes shown and described.

In testimony that I claim the foregoing I have hereunto set my hand in the presence of two witnesses.

CHAUNCEY B. BOSTWICK.

Witnesses:
 T. W. LINDSAY,
 JAS. BRYAR, Jr.